US007379936B2

(12) United States Patent
Kothuri et al.

(10) Patent No.: US 7,379,936 B2
(45) Date of Patent: May 27, 2008

(54) PRUNING OF SPATIAL QUERIES ON GEODETIC DATA WHEN QUERY WINDOW HAS HOLES

(75) Inventors: Ravikanth V. Kothuri, Nashua, NH (US); Siva Ravada, Nashua, NH (US); Daniel Geringer, Rockville, MD (US); Daniel Abugov, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 257 days.

(21) Appl. No.: 11/122,011

(22) Filed: May 5, 2005

(65) Prior Publication Data

US 2005/0203932 A1   Sep. 15, 2005

Related U.S. Application Data

(63) Continuation-in-part of application No. 10/397,530, filed on Mar. 27, 2003, now Pat. No. 7,185,023, which is a continuation of application No. 09/886,487, filed on Jun. 22, 2001, now Pat. No. 7,080,065.

(51) Int. Cl.
*G06F 7/00* (2006.01)
*G06F 17/30* (2006.01)
*G06F 17/00* (2006.01)
*G06F 7/60* (2006.01)
*G01C 21/30* (2006.01)

(52) U.S. Cl. ............... 707/5; 707/2; 707/3; 707/104.1; 707/100; 707/101; 703/2; 701/208

(58) Field of Classification Search ............ 340/825.37; 345/419; 382/261; 707/1, 3, 6, 100, 102, 707/104.1, 2, 5, 101; 703/2; 701/208
See application file for complete search history.

(56) References Cited

U.S. PATENT DOCUMENTS 5,963,956 A * 10/1999 Smartt .................... 707/104.1

(Continued)

FOREIGN PATENT DOCUMENTS

KR       2003032498 A  *  4/2003

(Continued)

OTHER PUBLICATIONS

Guting, Ralf H., An Introduction to Spatial Database Systems. VLDB Journal (vol. 3, No. 4, Oct. 1994), pp. 1-32.*

(Continued)

*Primary Examiner*—Pierre Vital
*Assistant Examiner*—Christopher P Nofal
(74) *Attorney, Agent, or Firm*—Hanify & King, P.C.

(57) ABSTRACT

A method for evaluating a spatial query comprises receiving a spatial query defining a query window including a void, identifying an interior circle for the query window, wherein the interior circle includes a void, and processing the spatial query by either (1) modifying the at least one interior circle to exclude the void, and using the modified interior circle to evaluate the spatial query by checking whether a data MBR is inside the modified interior circle and when it does, including the data item in the query result set, or (2) by checking whether a data MBR is inside the interior circle and when it does, checking whether the data MBR intersects the MBRs of any of the voids, and including the data item in the query result set when there is no intersection.

27 Claims, 12 Drawing Sheets

U.S. PATENT DOCUMENTS

| | | | | |
|---|---|---|---|---|
| 5,988,853 | A | * | 11/1999 | Kim et al. .................... 700/90 |
| 6,236,334 | B1 | * | 5/2001 | Tapperson et al. ..... 340/825.37 |
| 6,323,859 | B1 | * | 11/2001 | Gantt .......................... 345/419 |
| 6,438,269 | B1 | * | 8/2002 | Kim et al. .................. 382/261 |
| 6,643,629 | B2 | * | 11/2003 | Ramaswamy et al. ........ 706/45 |
| 6,757,686 | B1 | * | 6/2004 | Syeda-Mahmood et al. .......................... 707/100 |
| 6,778,981 | B2 | * | 8/2004 | Lee et al. ....................... 707/3 |
| 7,035,869 | B2 | * | 4/2006 | Smartt ........................ 707/102 |
| 7,080,065 | B1 | * | 7/2006 | Kothuri et al. ................. 707/3 |
| 7,185,023 | B2 | * | 2/2007 | Kothuri ................... 707/104.1 |
| 7,239,759 | B2 | * | 7/2007 | Nam et al. ................... 382/305 |
| 7,283,987 | B2 | * | 10/2007 | Cha et al. ....................... 707/2 |
| 2002/0018061 | A1 | * | 2/2002 | Gantt .......................... 346/419 |
| 2005/0222978 | A1 | * | 10/2005 | Drory et al. .................... 707/3 |
| 2006/0101005 | A1 | * | 5/2006 | Yang et al. ..................... 707/3 |

FOREIGN PATENT DOCUMENTS

KR          2004066942 A  *   7/2004

OTHER PUBLICATIONS

Samet et al., Spatial Data Models and Query Processing. Wesley / ACM Press, 1994, pp. 1-20.*

Rowe et al., Acquisition, Representation, Query, and Analysis of Spatial Data: A Demonstration 3D Library. IEEE, 2003, pp. 147-158.*

Oosterom et al., About Invalid and Clean Polygons, Nov. 23, 2004, Delft University of Technology, pp. 1-16.*

Ramsey, Paul, PostGIS Manual, Jan. 20, 2005, PostGIS, working paper, pp. 26-30.*

Holmes, Chris, "Dealing with tigerpoly.pl problems", Nov. 21, 2005, GeoServer, Version 1, pp. 1-9.*

* cited by examiner

US 7,379,936 B2

PRUNING OF SPATIAL QUERIES ON GEODETIC DATA WHEN QUERY WINDOW HAS HOLES

CROSS-REFERENCE TO RELATED APPLICATIONS

This application is a continuation-in-part of prior application Ser. No. 10/397,530, filed Mar. 27, 2003, now U.S. Pat. No. 7,185,023, which is a continuation of prior application Ser. No. 09/886,487, filed Jun. 22, 2001, now U.S. Pat. No. 7,080,065.

FIELD OF THE INVENTION

The present invention relates to a method for determining relationships among one or more three-dimensional query objects and one or more three-dimensional objects represented in a database.

BACKGROUND OF THE INVENTION

Information in databases may be organized according to any number of techniques. Examples of the many database indexes include the quadtree, the B-tree, and the R-tree. Different database index structures may be more suitable for particular types of data. For example, some database index structures, such as B+trees, may not be suited multi-dimensional data.

The R-tree is an object hierarchy that is applicable to arbitrary spatial objects that is formed by aggregating minimum bounding boxes for the spatial objects and storing the aggregates in a tree structure. The aggregation is based, in part, on proximity of the objects or bounding boxes. Each node in the tree represents a region in the space. Its children represent (possibly overlapping) subregions. The child regions do not need to cover the entire parent region. While the R-tree is designed primarily for storing region objects, it can be adapted to points by defining points as "degenerate" rectangles where all vertices are identical.

The number of objects or bounding boxes that are aggregated in each node is permitted to range between mM/2) and M, thereby leading to use of the prefix (m,M) to characterize a particular R-tree and mirroring the effect of a B-tree. The root node in an R-tree has at least two entries unless it is a leaf node, in which case it has just one entry corresponding to the bounding box of an object. The tree is height-balanced (with maximum height log r).

An R-tree can be constructed in either a dynamic or a static manner. Dynamic methods build the R-tree as the objects are encountered, while static methods wait until all the objects have been input before building the tree. The results of the static methods are usually characterized as being packed since knowing all of the data in advance permits each R-tree node to be filled to its capacity.

There are two principal methods of determining how to fill each R-tree node. The most natural method is to take the space occupied by the objects into account when deciding which ones to aggregate. An alternative is to order the objects prior to performing the aggregation. However, in this case, once an order has been established, there is not really a choice as to which objects (or bounding boxes) are being aggregated. One order preserves the order in which the objects were initially encountered. That is, the objects in aggregate i have been encountered before those in aggregate i+1.

According to one method, insertion of a region object R occurs as follows. Starting at root, children that completely contain R are identified. If no child completely contains R, one of the children is chosen and expanded so that it does contain R. If several children contain R, one is chosen and the process proceeds to the next child.

The above containment search is repeated with children of the current node. Once a leaf node is reached, R is inserted if there is room. If no room exists in the leaf, it is replaced by two leaves. Existing objects are partitioned between two leaves and parent. If no room exists in the parent, change propagates upward.

One difference between static and dynamic methods is that static methods rebuild the entire R-tree as each new object is added. In contrast, dynamic methods add the new objects to the existing R-tree. Dynamic methods differ in the techniques used to split an overflowing node during insertion.

There are two types of dynamic methods. The first type has the goal of minimizing coverage and overlap. These goals are at times contradictory and thus heuristics are often used. The second type makes use of the ordering applied to the objects (actually their bounding boxes). They are termed nonpacked. In this case, the result is equivalent to a B+-tree and all update algorithms are B+-tree algorithms. These update algorithms do not make use of the spatial extent of the bounding boxes to determine how to split a node. Thus, the goals of minimizing overlap or coverage are not part of the node splitting process although this does not preclude these methods from having good behavior with respect to these goals.

Static methods differ on the basis of the method used to order the objects. The dynamic methods that are not based on an ordering, that is, reduction of coverage and overlap, range from being quite simple, for example, exhaustive search, to being fairly complicated, for example, R*-tree. Some methods just split the overflowing node, while others, that is, the R*-tree, try to reinsert some of the objects and nodes from the overflowing nodes thereby striving for better overall behavior (e.g., reduction in coverage and overlap).

In general, the goal of splitting techniques is to minimize coverage and overlap. These goals are at times contradictory and, thus, heuristics are often used. Below are listed a few node splitting algorithms that range from being quite simple, for example, exhaustive search, to being fairly complicated, for example, R*-tree. Some methods split the overflowing node, while others try to reinsert some of the objects and nodes from the overflowing nodes, thereby striving for better overall behavior, for example, reduction in coverage and overlap.

A number of different node splitting algorithms may be tried, including:
 I. Dynamic Methods Based on Minimizing Coverage and/or Overlap
  1. Exhaustive search
  2. Quadratic method
  3. Linear method
  4. R*-tree
  5. Ang/Tan method
 II. Dynamic Methods Based on an Ordering (Nonpacked)
  1. Hilbert nonpacked
  2. Morton nonpacked
 III. Static Methods Based on an Ordering
  1. Packed
  2. Hilbert packed
  3. Morton packed
  4. VAM split R-tree
  5. Top-down-greedy split (TGS) R-tree Methods I and II are useful for insertion, while method III is typically used for "bulk" creation, that is, creation of indices on a given set of objects.

A spatial or geographic database can include data concerning locations of features in space or on a surface. For example, a geographical database can include data concerning the location of various objects in a region. Along these lines, a geographic database can include mathematical representations of counties, cities, homes, apartment buildings, parks, businesses, subway stations, and other features. The location information could be in the form of latitude and longitude data or other data that defines position.

Once a database including this information is created it is typically desired to access and utilize the information. One way that the information in the databases is utilized involves determining the relative positions of particular locations. Along these lines, a person might want to find certain types of businesses in a zip code region. At times, it may be desirable to generally determine whether objects in a database have overlapping locations and, if so, the extent of the overlap.

Analyses such as those described above of data in spatial and/or geographic databases can present a number of problems. To determine relationships among data in a database can overtax memory and computing power, take an unacceptable period of time or cost an unacceptable amount of money. This is especially true with data in geographic databases.

For example, one problem concerning trying to determine whether objects have overlapping locations can involve actually comparing the outlines of the objects to see if any interactions exist. However, carrying out a point-by-point comparison of two geometries typically requires quite a long time, in many cases, on the order of hours.

Solutions to this problem have been described for two dimensional data, in U.S. application Ser. No. 09/886,487, and for three dimensional data, in U.S. application Ser. No. 10/397,530. However, a problem arises when the query window contains one or more holes, that is, areas that are to be excluded from the query, but which lie wholly or partially within areas that are to be included within the query. The prior solutions do not work well when the query window contains holes. A need arises for a technique by which spatial queries can be more quickly and efficiently processed when the query window has holes.

SUMMARY OF THE INVENTION

The present invention provides quicker and more efficient processing of spatial queries when the query window has holes. In one embodiment of the present invention, a method for evaluating a spatial query comprises receiving a spatial query defining a query window including a void, identifying an interior circle for the query window, wherein the interior circle includes a void, modifying the at least one interior circle to exclude the void, and using the modified interior circle to evaluate the spatial query.

In one aspect of the present invention, modifying the at least one interior circle to exclude the void comprises determining a distance from a center of the interior circle to a closest point of the void or to a closest point of a minimum bounding rectangle of the void, and modifying the interior circle to form a modified interior circle having a same center as the interior circle and having a radius equal to the determined distance. Using the modified interior circle to evaluate the spatial query comprises comparing each of a plurality of candidate data minimum bounding rectangles to the modified interior circle and including a data item represented by a data minimum bounding rectangle in a result set of the query, if the data minimum bounding rectangle is inside the modified interior circle.

In one aspect of the present invention, the interior circle includes a plurality of voids and modifying the at least one interior circle to exclude the void comprises determining a distance from a center of the interior circle to a closest point of each of the plurality of voids or to a closest point of a minimum bounding rectangle of each of the plurality of voids to form a plurality of determined distances, selecting a minimum distance from among the plurality of determined distances, and modifying the interior circle to form a modified interior circle having a same center as the interior circle and having a radius equal to the selected distance. Using the modified interior circle to evaluate the spatial query comprises comparing each of a plurality of candidate data minimum bounding rectangles to the modified interior circle and including a data item represented by a data minimum bounding rectangle in a result set of the query, if the data minimum bounding rectangle is inside the modified interior circle.

In one embodiment of the present invention, a method for evaluating a spatial query comprises receiving a spatial query defining a query window including a void, identifying an interior circle for the query window, wherein the interior circle includes a void, determining a minimum bounding rectangle for the void, comparing the minimum bounding rectangle for the void with the interior circle for the query window to determine whether the minimum bounding rectangle for the void is inside the interior circle for the query window, comparing each of a plurality of candidate data minimum bounding rectangles to the interior circle to determine whether the data minimum bounding rectangle is inside the interior circle for the query window, comparing each data minimum bounding rectangle that is inside the interior circle for the query window with a void for which the minimum bounding rectangle for the void is inside the interior circle for the query window to determine whether the data minimum bounding rectangle intersects with the void, and including a data item in a result set of the query, if the data minimum bounding rectangle of the data item is inside the interior circle, but does not intersect the void.

In one embodiment of the present invention, the method further comprises, for each data item not included in the query result set, computing an interior circle for the query window using the center of a data minimum bounding rectangle representing the data item as a center of a new interior circle and comparing the new interior circle and the voids included in the query window with a circle that circumscribes the data minimum bounding rectangle representing the data item.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

A spatial or geographic database can include data concerning locations of features in space or on a surface. Spatial data can include geometric data that includes simple primitive elements such as lines, curves, polygons (with and without holes), and compound elements that are made up of a combination of the primitive elements. For example, a geographical database can include data concerning the location of various objects in a region. Along these lines, a geographic database can include mathematical representations of counties, cities, homes, apartment buildings, parks, businesses, subway stations, and other features. The location information could be in the form of latitude and longitude data or other data that defines position.

Once a database including this information is created it is typically desired to access and utilize the information. One way that the information in the databases is utilized involves determining the relative positions of particular location. Along these lines, a person might want to find certain types of businesses in a zip code region. At times, it may be desirable to generally determine whether objects in a database have overlapping locations and, if so, the extent of the overlap.

Analyses such as those described above of data in spatial and/or geographic databases can present a number of problems. To determine relationships among data in a database can overtax memory and computing power, take an unacceptable period of time or cost an unacceptable amount of money. This is especially true with data in geographic databases.

For example, one problem concerning trying to determine whether objects have overlapping locations can involve actually comparing the outlines of the objects to see if any interactions exist. However, carrying out a point-by-point comparison of two geometries typically requires quite a long time, in some cases, on the order of minutes and, in extreme cases, hours.

The present invention provides a solution to problems of analyzing objects in databases. As such, the present invention provides a fast and simple method for determining whether two objects, or geometries, defined by data in a database intersect. Rather than taking minutes or hours to carry out, the present invention can take on the order of seconds or milliseconds. By reducing calculation times, the present invention can free up a processor to perform other calculations or for other uses, such as queries or scalability. The present invention also permits better service to be provided by reducing response times. This helps to ensure that the solution can be utilized with any geographic database, regardless of how large.

Figure 1:
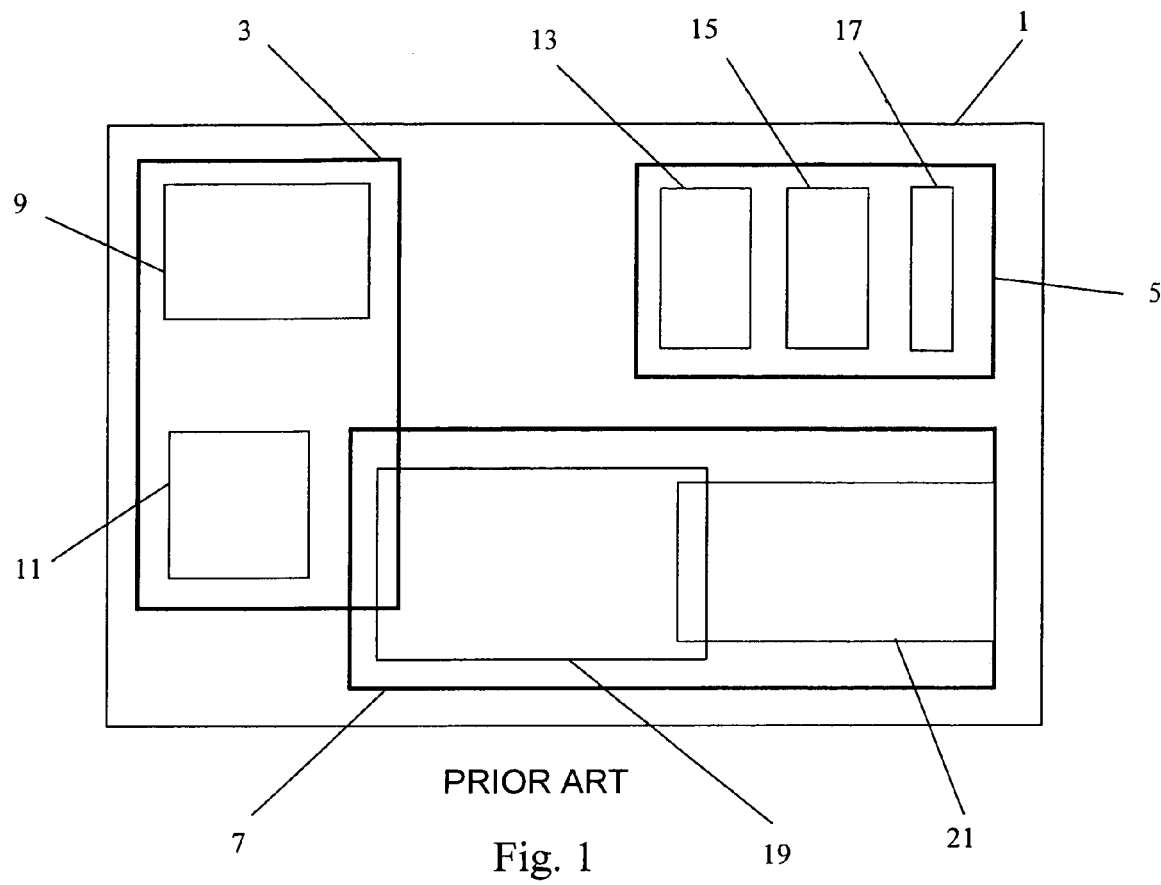
FIG. 1 represents an example of an R-tree node including two levels of children.

FIG. 1 represents a simple R-tree for illustrative purposes. The R-tree shown in FIG. 1 includes a plurality of rectangular objects. An R-tree may be utilized to index databases of objects in the form of points, lines, or rectangles. The objects may be represented by minimum bounding contours. Additionally, the objects may be grouped in groups by minimum bounding contours.

The R-tree node shown in FIG. 1 includes two levels of children. Node 1 shown in FIG. 1 includes minimum bounding contours 3, 5, and 7, representing the first level of children. Each child node 3, 5, and 7, in turn, includes a plurality of child nodes, 9 and 11 in child 3; 13, 15, and 17 in child 5; and 19, and 21 in child 7. Each child node is defined by a minimum-bounding contour. In the example shown in FIG. 1, the minimum bounding contours are all rectangles.

Figure 2:
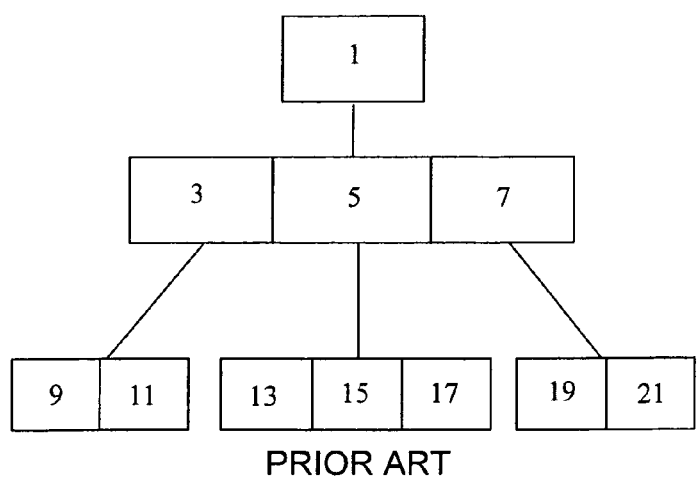
FIG. 2 represents a block diagram of an R-tree index corresponding to the example shown in FIG. 1.

FIG. 2 represents a block diagram showing an R-tree corresponding to the example illustrated in FIG. 1. For objects that are stored in respectively different leaf nodes, the more remote the nearest common ancestor node, the more different the objects are likely to be. That is, strokes or strings stored in leaf nodes having a common parent are likely to be more similar to each other than strokes or strings stored in leaf nodes only having a common grandparent.

The R-tree index may be utilized to support medium-dimensionality data, that is, data having a dimensionality in the range of 3-10. The R-tree index may be implemented utilizing an extensible indexing framework. One example of such a framework is referred to as cooperative indexing in Oracle9i, available from Oracle Corporation. This framework can allow easy creation and maintenance of domain-specific index structures on top of a server layer while reaping the full benefits of operating within a database framework. As a consequence, the R-tree index structure inherits features such as transactional semantics, integrated backup and recovery, security, and replication from the underlying database.

In the specific example of Oracle8i, the R-tree index can index two datatypes. The first datatype includes an sdo_mbr type, which is a d-dimensional rectangle specified by the lower-left and the upper-right corners. The second datatype, is an sdo geometry type, which is an Oracle8i object type that allows for the specification of complex geometries (as defined by OGC).

Data items may be stored in a relational table, which may be referred to as the base table. The R-tree constructed for the data items may be stored in the database using a metadata table storing the information about the root of the R-tree, its dimensionality and fanout, and the name of the index table storing the nodes of the R-tree.

The R-tree index type can support three types of operations: window queries, nearest-neighbor queries, and intersection joins. Window queries specify a query window and retrieve data whose MBRs interact with the query window in one of 4 ways: intersection, containment, enclosure and exact-match. Nearest-neighbor queries specify a query point and retrieve the k closest data MBRs. Joins identify the data items of two different datasets that intersect with each other. Note that these queries are processed using the MBRs. For some applications such as GIS data where the bounding rectangles only represent first-level approximations of the data items, the query result may have to be post-processed using the complete extents of the data items to obtain the final result. In addition to indexing inherently multi-dimensional columns, R-trees can also be used to index multiple columns so as to answer queries on multiple columns efficiently.

A number of relationships can exist between and among objects represented in the R-tree. The objects may overlap to some extent, an object may lie entirely in another object or vice versa, the borders of objects may intersect, or the objects maybe disjoint and have no overlap at all. Typically, a "query" geometry is provided and it is desired to identify geometries in the database, or "data geometries", that do or do not interact in some manner with the query geometry. Some times, it may be desirable to determine objects interacting in specific ways, such as all objects entirely within a query geometry. At other times, it maybe desirable to identify any objects that "interact" with a particular query geometry. While objects may be compared by performing an exact comparison of the geometries that define the objects, such a comparison can take a long time and be very costly. For example, if a processor is tied up performing a comparison of geometries, then the processor is unavailable for other functions.

Examples of queries and interactions can include the following:
  window queries with different "interaction" criteria
  intersection: identify data geometries that intersect the query geometry
  inside: identify data geometries that are "completely inside" the query geometry
  coveredby: identify data geometries that "touch" on at least one border and are inside the query geometry otherwise
  contains: reverse of inside
  covers: reverse of coveredby
  touch: identify geometries that only "touch" the query geometry but disjoint otherwise
  equal: identify geometries that are exactly the same as the query geometry within-distance (or epsilon) queries: identify geometries that are within a specified distance from the query geometry
  nearest-neighbor queries: identify the k nearest neighbors for a query geometry.

Typically, the most frequently used window queries are the ones asking for intersection-type, inside-type, and contains-type of interactions. Within-distance queries can be thought of as intersection-type of window queries where the query geometry is enlarged by the specified distance.

Figure 3:
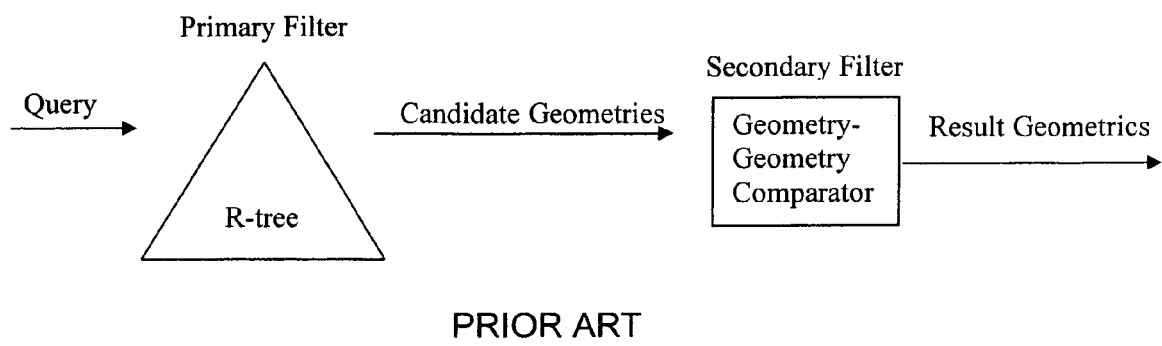
FIG. 3 represents a flowchart that illustrates query processing according to a known method.

Existing solutions to queries such as those described above may utilize a primary filter in a first stage to identify all candidate geometries that could possibly interact with a query geometry, as represented in FIG. 3. In the first stage exterior approximations for data geometries, such as minimum bounding rectangles (MBRs) and convex hulls, or quadtree tiles, which completely enclose the data geometries, may be used. This first stage, usually referred to as the primary filter, typically involves a spatial index. Candidate geometries that may satisfy a given query criterion are identified in the primary filter stage with the help of the exterior approximations in the spatial index.

In a second stage, referred to as a secondary filter, the candidate geometries identified in the first stage are compared with the query geometry and the exact result set is determined and returned to the user. A secondary filter is then employed to perform the exact mathematical comparison of all of the candidate geometries with the query geometry. Even utilizing such filters, the mathematical comparison can be quite expensive. For example, if the query geometry is large, there will be too many candidates that are completely inside the query geometry. As described above, passing each candidate through the secondary filter is quite expensive. On the other hand, if the query is small and many candidates exist that contain the query, then the query can also be quite expensive.

For most spatial datasets, the data geometries typically have hundreds or thousands of vertices and are arbitrarily complex. Secondary filter computation for such geometries takes a long time as opposed to the primary filter. FIG. 2(a) illustrates this by comparing the time taken for primary and secondary filters according to an example utilizing Oracle Spatial available from Oracle Corporation. The data consists of 230K polygons representing the US census blocks.

The queries correspond to an approximate geometry that represents a circle of 0.25, 0.5, 1, 2, 5, 10, 25, 50, or 100 mile radius on the surface of earth. Since arcs and circles are not easily representable on the surface of the earth the circle queries are densified to regular convex polygons in geodetic and non-geodetic domains. The center of the query is randomly-generated using locations of business centers across the United States. Such queries, where the query area is larger than those of the spatial features, are quite common in most GIS applications and spatial analysis queries. The x-axis shows the radius in miles from the query center and the y-axis plots the response time for each filter. The figure illustrates that the secondary-filter time is at least twice that of the filter time and dominates the overall computation time. This holds for all radii for the query circle.

The high cost for carrying out the secondary-filter is due to two reasons. First, the loading cost for geometries, or in other words, the cost of the table accesses that fetch candidate geometries. Second, the high cost is attributable to the comparison cost, which is the cost of comparing complex data geometries with the query geometry. For point datasets, the loading cost dominates and for polygon datasets, both costs contribute significantly.

A prior solution provides a method that can analyze the geometries and eliminate many geometries from the need to perform the costly and time-consuming mathematical comparison of the geometries. This prior solution solves the problem by including an intermediate filter that can eliminate many, if not most, candidates from needing to undergo the expensive secondary filter. This prior solution is particularly useful where the query geometry is particularly large or particularly small. Identifying geometries that lie entirely within the interior rectangle can eliminate these geometries from undergoing the costly exact mathematical comparison.

Figure 4A:
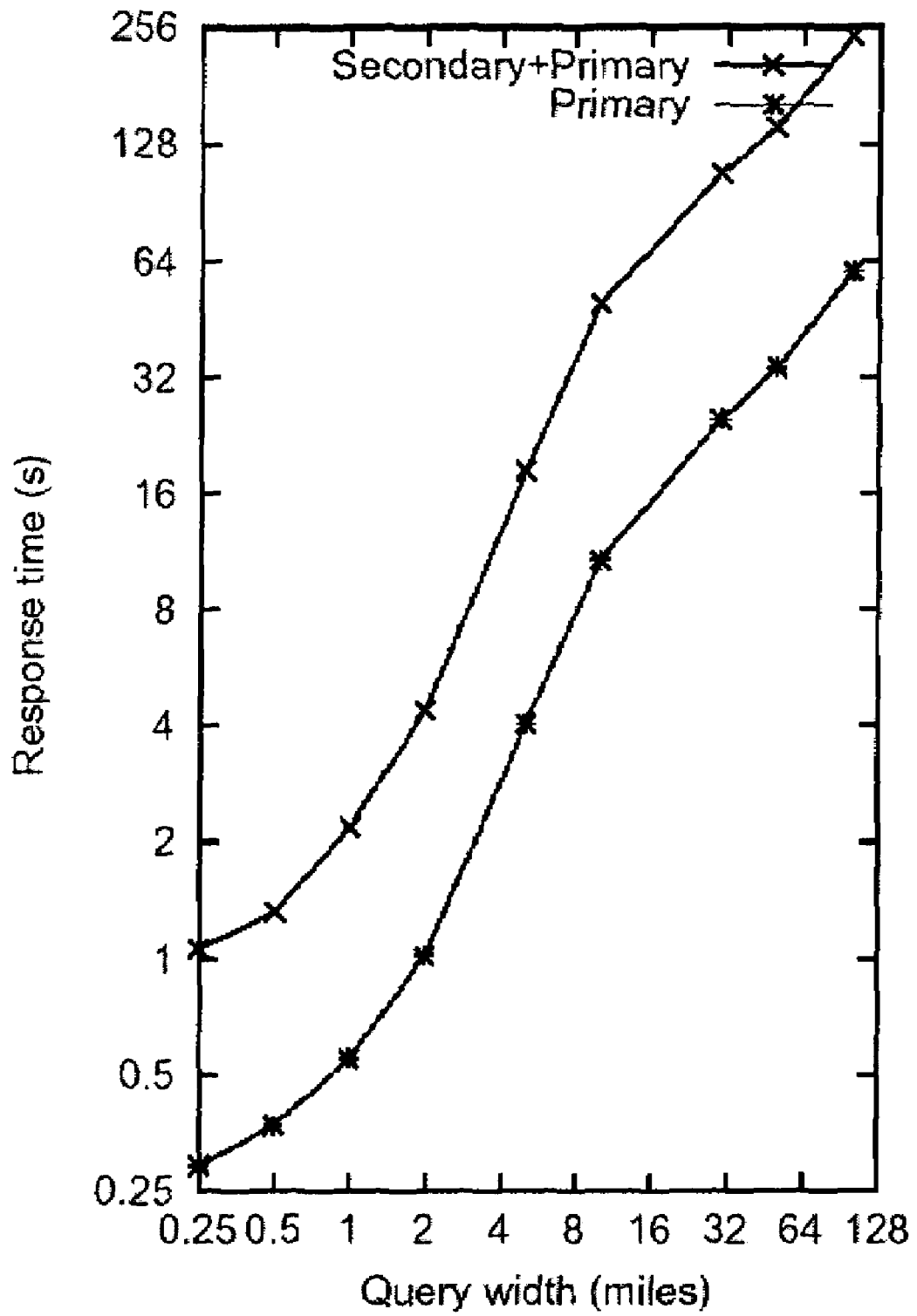
FIG. 4a represents a graph that illustrates a relationship between response time and query width for a query carried out according to a known process including a primary and a secondary filter.
Figure 4B:
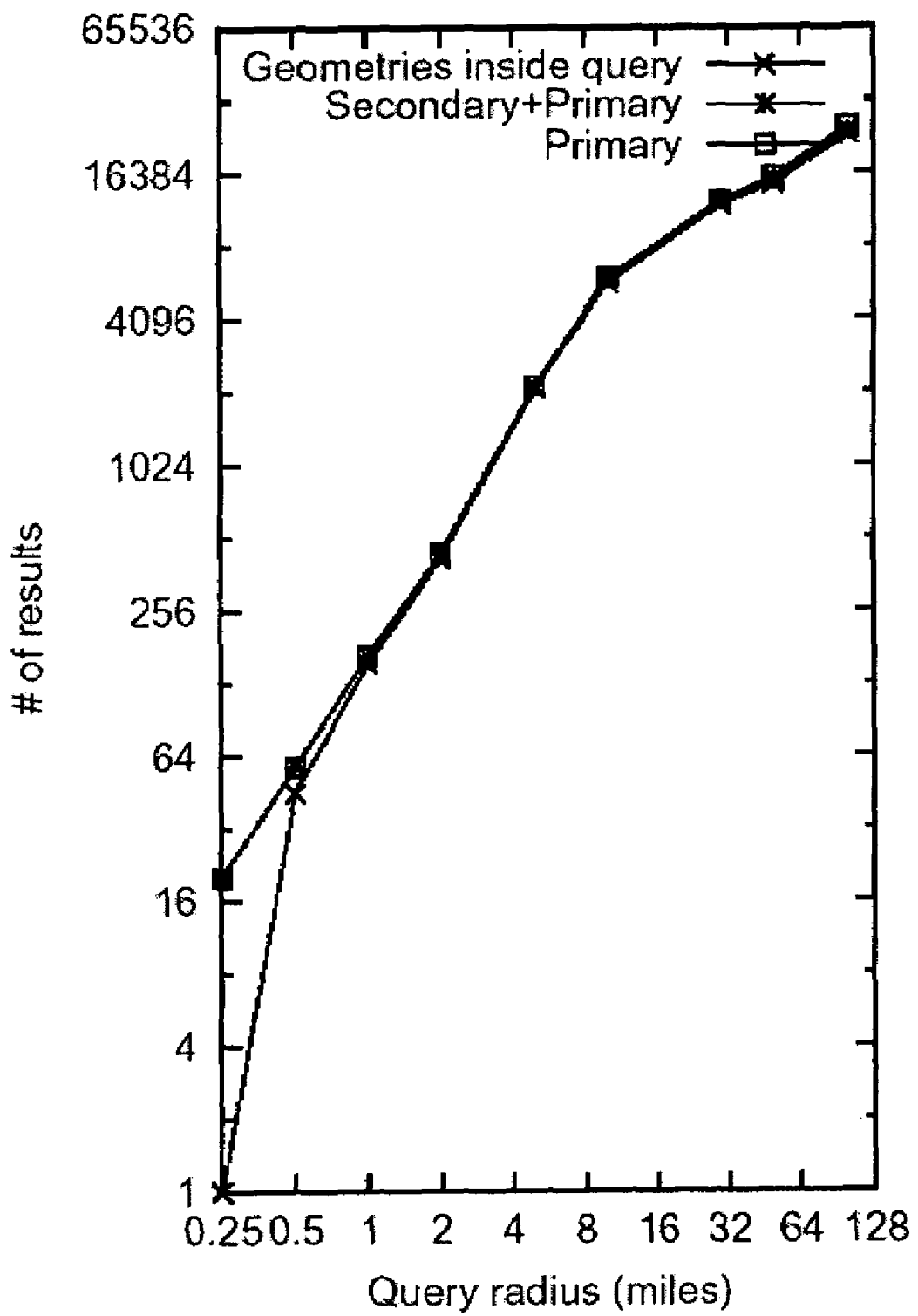
FIG. 4b represents a graph that illustrates a relationship between number of results and query radius for a query carried out according to a known process including a primary and a secondary filter.

FIG. 4(a) illustrates that the number of geometries eliminated in the secondary filter is quite small compared to the total number retrieved. FIG. 4(b) shows that in almost all the cases the difference in primary and secondary filter results is less than about 10%. Additionally, FIG. 4(b) also indicates that as the query radius increases a substantial number of the results are completely inside the query. From this, it could be inferred that whenever the query window is large compared to data sizes, checking for containment in the query may be a useful pruning strategy for bypassing the secondary filter. That is, if a data geometry is completely inside a query geometry, then it could be accepted without passing it to the expensive secondary filter.

In order to improve query performance, the idea is to eliminate expensive query-data geometry comparisons whenever possible. This is possible for data geometries that are completely interior to query geometries which can be directly included in the result set without doing the expensive query and data geometry comparison.

The present invention relates to making determinations of relationships simpler and easier, particularly with comparisons of three-dimensional objects. While the previous methods provide methods applicable to two-dimensional data, the present invention particularly applies to data on the surface of the sphere and is applicable to terrestrial, or geodetic, data, or astronomical data where the data is modeled as being on the surface of a sphere. The present invention may also be utilized in analyzing other three-dimensional objects as well.

Algorithms for processing two-dimensional data typically cannot be applied to data that consists of geometries on the surface of a three-dimensional sphere. Computing the maximum interior rectangle for such three-dimensional surface geometries is complicated. In fact, no algorithms exist computing maximum interior rectangles of such geometries. The present invention presents methods that include computing interior circles for the three-dimensional surface geometries. Such circles are relatively easy to compute and can be utilized to speed up queries.

As in processing two-dimensional geometries, the main problem in the present invention is to retrieve data geometries that interact with a query geometry. Both data and query geometries may be three-dimensional surfaces on the surface of the earth. Queries may be answered by first comparing three-dimensional volume approximations in the R-tree index. If the geometries intersect each other, the exact three-dimensional geometries may be compared. As with two-dimensional geometries, the second part is very time consuming. The present invention provides methods for reducing or eliminating the time consuming exact comparison to as great a degree as possible.

In order to improve query performance, the idea is to eliminate expensive query-data geometry comparisons whenever possible. This is possible for data geometries that are completely interior to query geometries. Such geometries can be directly included in the result set without doing the expensive query and data geometry comparison. However, the present invention addresses the processing of three-dimensional data, as opposed to known processes for analyzing data representing two-dimensional objects.

The present invention can take all possible geometries that could possibly fulfill a particular query, filter out ones that cannot possibly satisfy the query and ones that definitely satisfy the query, thereby reducing the number of queries to which an exact mathematical comparison must be performed to determine if it satisfies the query. It may be determined that a data geometry definitely satisfies a query by determining that the geometry lies entirely within a query geometry.

The first and second geometries may have any relative size. Along these lines, the first geometry may be larger than the second geometry or vice versa. Also, the first and second geometries typically are two-dimensional. The geometries may represent various real objects. For example, the geometries may represent geographic locations. According to the present invention, the geometries typically represent regions on the surface of a non-planar body, such as regions on the earth's surface.

Geodetic data represented as surface on the three-dimensional sphere representing the earth provides an accurate representation of the surface of the ellipsoidal earth. Geometries in such a context can represent, for example, country boundaries, state boundaries, city boundaries, property boundaries, and/or particular locations, such as locations of homes, restaurants, or shops. A query in such a context may not differ from a query for two-dimensional data. Along these lines, a query may specify a geometry and a criterion. The geometry specified could include both a boundary of the geometry and location of the geometry. The criterion could include any of a number of interactions between the specified geometry and geometries to which the specified geometry is compared.

Prior techniques for analyzing two-dimensional geometries that utilize minimum bounding rectangles, tiles and other techniques typically are not easily adaptable to three-dimensional geometries. Along these lines, to adapt the prior techniques to three-dimensional data typically would require great cost, complicated adaptations and/or would not be adaptable and would result in the need to develop new techniques.

Geometries analyzed according to the present invention may be data geometries stored in a database. The database may be a spatial database. The database may store exact geometries and/or approximations of geometries. The database may be organized in an R-tree hierarchy or a variant of an R-tree.

One of the parts includes determining if a data geometry is interior to a query geometry and whether a user-specified distance is within a threshold value. Typically, it is determined whether the distance is greater than zero. If it is determined that a data geometry is interior to a query geometry and whether a user-specified distance is within a threshold value, then the data geometry may be directly included in a result set.

In carrying out the invention, one or more circles may be defined within a first geometry. The circles may lie entirely within the first geometry. Also, the circles may be defined with centers at various locations in the first geometry. The circles are compared to a second geometry to determine if one or more filter conditions are satisfied. Determining if the conditions are satisfied can determine the relationship between the first and second geometries. Determining if one or more filter conditions are satisfied may be sufficient to discern the relationship between the first geometry and the second geometry. Alternatively, after determining if the filter condition(s) are satisfied, an exact mathematical comparison between the first geometry and the second geometry may need to be carried out to discern the relationship between the first geometry and the second geometry.

The circles may be defined about one or more points located within the first geometry. According to one embodiment, a center of a first geometry is identified. The center may be a centroid.

A minimum distance from the center of the geometry to a boundary of the first geometry is identified. Next, a circle is defined that has the minimum distance to the boundary as its radius and the center of the geometry as its center. The circle is then compared to a second geometry to determine if the second geometry fulfills a first filter condition with respect to the first geometry.

One or more circles may alternatively or additionally be defined in other locations in the first geometry. For example, one or more circles may be defined along one or more lines extending in the interior of the first geometry. According to one embodiment, a plurality of circles are defined along a maximum span line of the first geometry. First, the maximum span line of the first geometry is defined. Then, a plurality of points where circles are to be defined are identified on the line.

A variety of methods may be utilized to define or locate a maximum span line. According to one method, a minimum bounding rectangle (mbr) enclosing the first geometry may be defined. The lengths of the mbr along the x and in the y-dimension may then be identified. If the length is greater in the x-dimension, then x is the maximum span dimension. A line parallel to the maximum span dimension (either x or y) passing through the center of the MBR of the geometry is the maximum span line. Alternately, the line could pass through the center of the geometry instead of the center of the MBR of the geometry. According to another embodiment, any line connecting two non-adjacent vertices of the first geometry can also be used as a maximum span line.

If (x11, y1) is the lower-left corner of the MBR and (x2,y2) is upper-right corner of the MBR, and x is the maximum-span dimension, then a variety of n centers along the maximum span line $y=(y2-y1)/2$ can be chosen as described below. Typically, "n" is an odd number.

i' the center: $[n*(x2-x1)/(n+1), (y2-y1)/2]$

EXAMPLE For $n=1$, the center is at $[(x2-x1)12, (y2-y1)/2]$

For $n=3$, the centers are at $[(x2-x1)/4, (y2-y1)/2]$ $[2*(x2-x1)/4, (y2-y1)/2][(x1-x1)/2,(y2-y1)/2][3*(x2-x1)/4,(y2-y1)/2]$ This may be carried out as many times as desired.

According to another embodiment, centers may be chosen using other dimensions that are not the maximum-span dimensions. In one embodiment of the invention, eleven centers are chosen along the maximum dimension.

In another embodiment of the invention, seven centers are utilized along the maximum-span dimension and three centers along the second dimension are chosen.

The number of points along a line, such as the maximum span line, that circles are defined about may vary. Typically, one to fifteen circles are defined. According to one embodiment, 11 circles are defined. According to one embodiment, circles may be defined at regularly spaced locations one-quarter, one-half, and three-quarters of the length of the maximum span line. The circles could be centered at any locations spaced at other intervals, such as every third, eighth, sixteenth, or other fraction of the length of the maximum span line. The circles could also be centered at points otherwise spaced, such as randomly.

After defining one or more points for centers of circles, a minimum distance from each point to the boundary of the first geometry may be determined. Subsequently, a circle may be defined about each identified point; each circle has as its radius the minimum distance from each point to the boundary of the first geometry. The defined circles are then compared to the second geometry to determine if one or more filter conditions are fulfilled. Determining if the filter condition(s) is fulfilled can help eliminate candidate geometries, confirm that candidate geometries have a sought relationship with the second geometry or confirm that candidate geometries may have a sought relationship with the second geometry and that a mathematical comparison should be carried out.

Since the present invention involves data on the three-dimensional data, such as three-dimensional spherical surface of the earth (3-d surface data), finding a point "c" on the 3-d sphere and identifying everything within distance "r" on the 3-d spherical surface covers a portion of 3-d spherical surface with a "small-circle" projection onto a 2-d plane. This structure is referred to herein with a center point "c" and radius "r" on the 3-d spherical surface as a 3-d surface circle (or as "circle" when there is no ambiguity).

Figure 5:
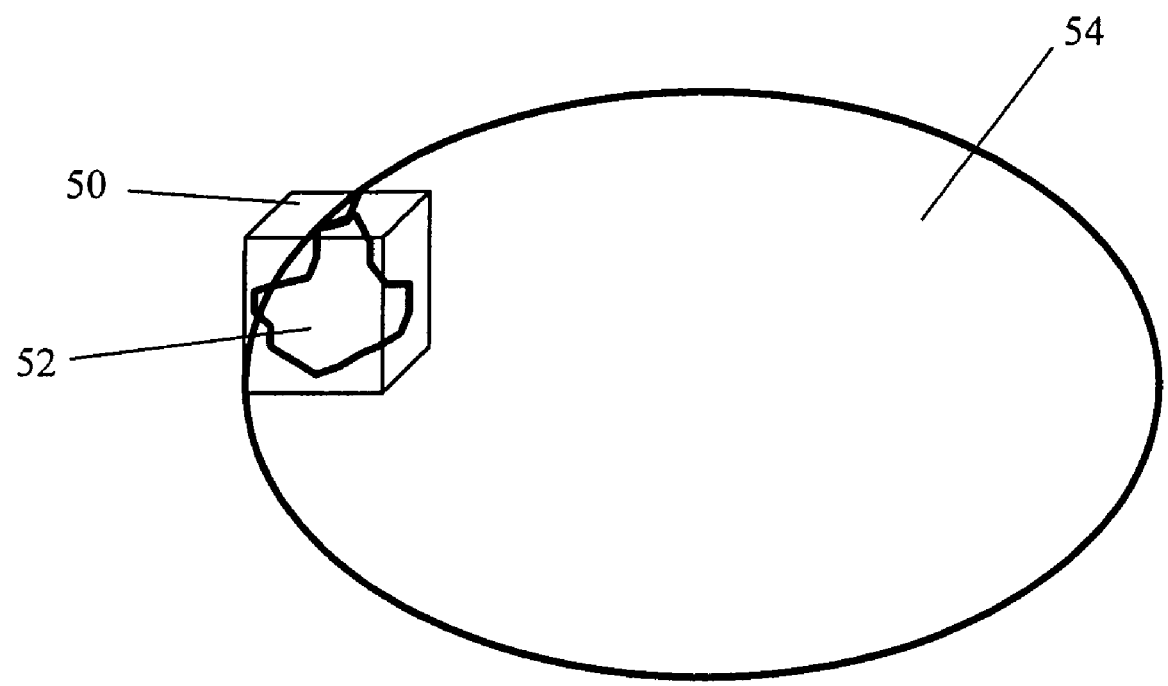
FIG. 5 illustrates a three-dimensional minimum bounding rectangular solid for a three-dimensional geometry.

Rather than defining the center points for circles with respect to the first geometry, the points may be defined with respect to a minimum bounding rectangle, volume or other approximation or representation of the first geometry. One restriction on this process may include that the defined "circle" is interior to the first geometry". In one embodiment of the invention, the circles may be identified using the projected 2-d MBRs of the 3-d spherical surfaces as described above. FIG. 5 illustrates an example of a three-dimensional minimum bounding rectangular solid 50 for a three-dimensional geometry 52 that includes a region of the surface of the earth 54. Circle(s) may be defined about the center of the representation. Alternatively, the points may be defined along a line, such as the maximum span line of the representation. In embodiments where the center points of circles are defined with respect to a representation of a geometry, the circles may be identified as described above.

Figure 6:
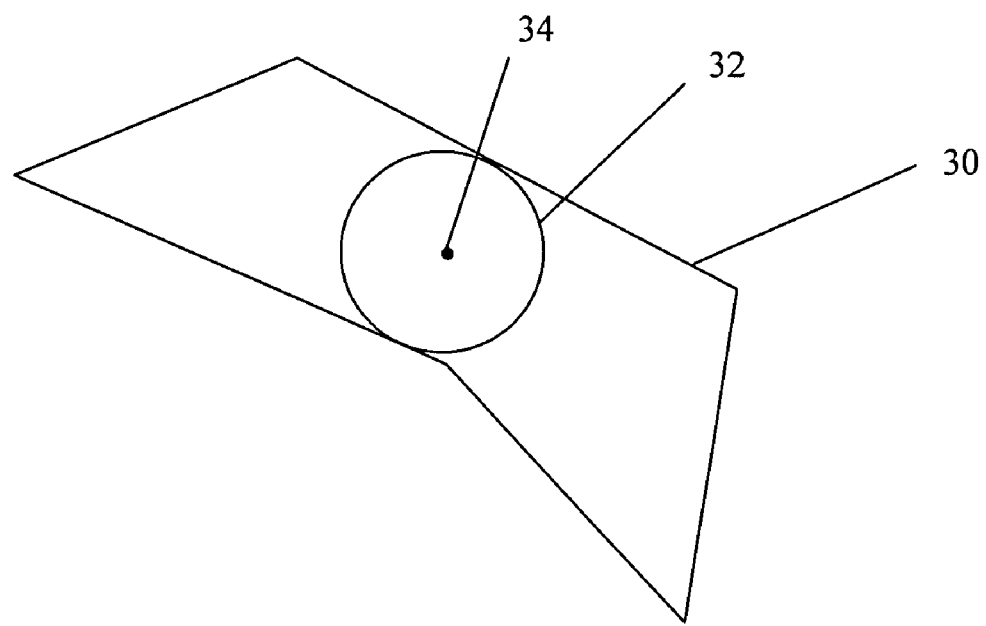
FIGS. 6-9 illustrate various aspects of elements of processes according to the present invention.
Figure 7:
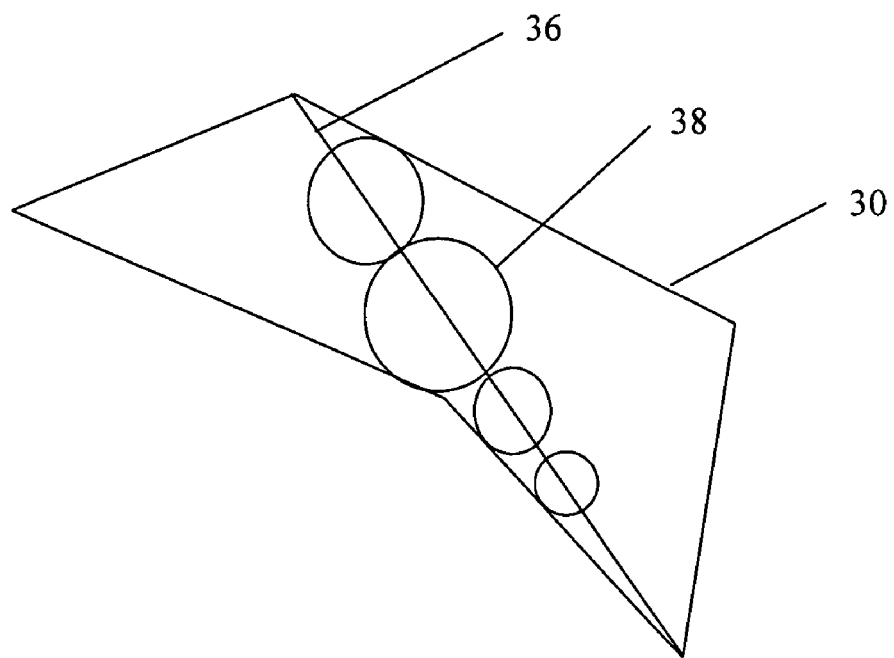
Figure 8:
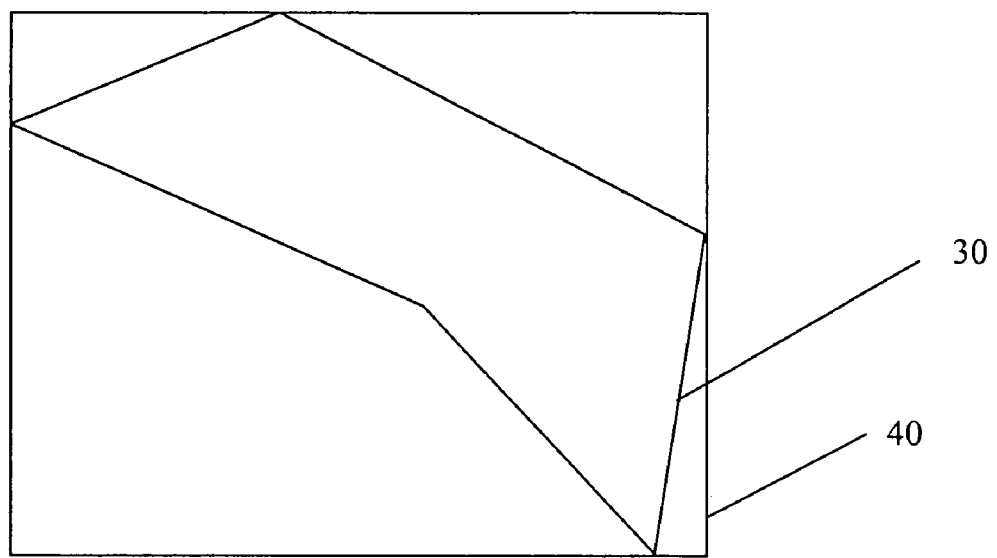
Figure 9:
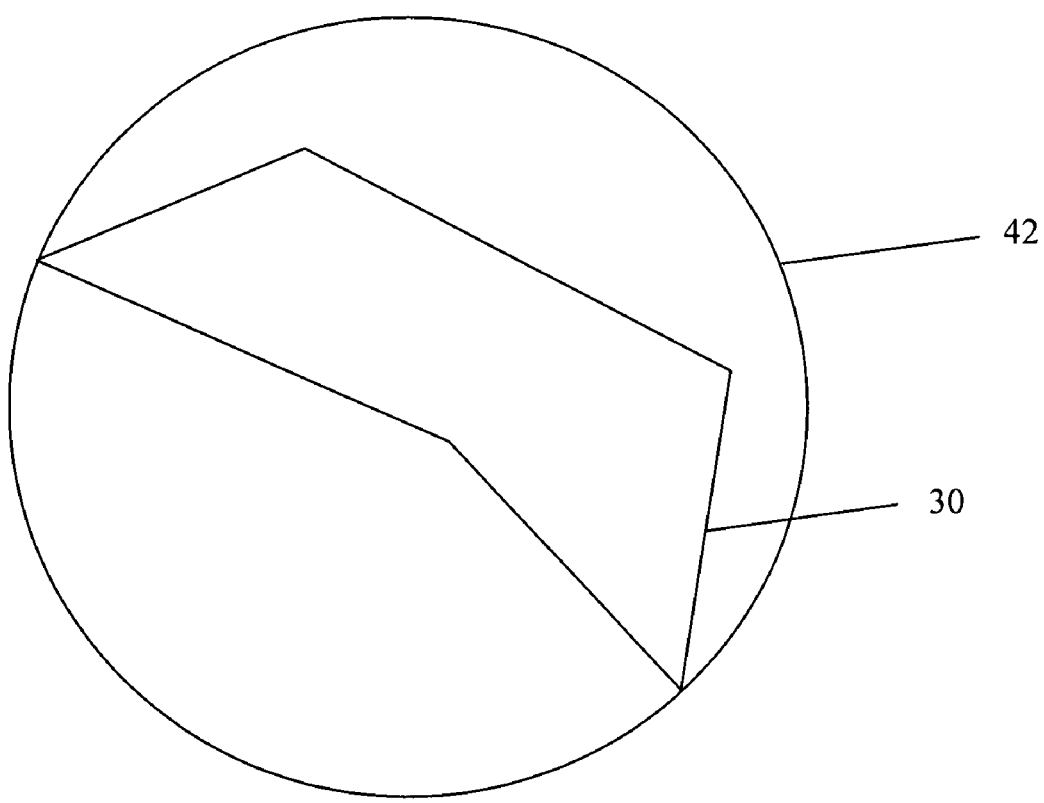

FIGS. 6-9 illustrate various aspects of the present invention. Along these lines, FIG. 6 illustrates a geometry 30 with a circle 32 defined about a center 34 of the geometry. The circle has as its radius the minimum distance from the center point to the boundary of the geometry. FIG. 7 illustrates the geometry 30 with a maximum span line 36 defined therein. A plurality of circles 38 are defined at various points along the maximum span line, which is the line connecting two vertices of the geometry. The circles each have as their radius the minimum distance from their center point to the boundary of the geometry. FIG. 8 illustrates the geometry 30 with a minimum bounding rectangle 40. One the other hand, FIG. 9 illustrates the geometry 30 and a minimum circumference 42 circle defined about the geometry. Other geometries are not shown in FIGS. 6-9 to facilitate a clear view of the elements shown therein.

Similarly, rather than comparing the circle(s) defined in the first geometry with the second geometry, the circle(s) may be compared with a minimum bounding volume or other representation of the second geometry. In such embodiments, a minimum bounding volume or other representation of the second geometry is defined. The circles may then be defined with respect to the representation of the geometry. For example, the circles could be defined on the surface of a minimum bounding volume. The circles may then be compared to the minimum bounding rectangle or other representation of the second geometry.

In any of the above methods, rather than defining the circles with respect to the first geometry or a representation thereof, the circles may be defined with respect to the second geometry or a representation thereof. The circles and the first geometry or representation thereof may then be compared. In either case, different filter conditions may be employed in the comparison of the geometries, representations of the geometries, circles and/or other elements.

In one embodiment of the invention, projected 2-d MBRs of 3-d surface data, such as 3-d spherical surface data, may be used to identify appropriate centers as described earlier. Alternately, any point "c" inside a first geometry could be identified using the extent of the 3-d volume or any other representation. The radius of the interior-circle at this point c can be computed as described above by identifying the minimum distance to the boundary of the first geometry. The minimum bounding rectangle may be defined with respect to two orthogonal axes. Each plane is positioned as far along each axis so as to still intersect the geometry.

After defining a minimum bounding volume or rectangle, the center of the volume or rectangle may be located. The center of the minimum bounding volume or rectangle may then be projected on the surface of the geometry. A circle may be defined on the surface of the geometry about the point projected on the geometry. The circle may be defined as described above.

After defining circles with respect to query and/or data geometries, the geometries, representations of the geometries and/or the circles may be compared to determine if the geometries fulfill a first filter condition with respect to each other. Filter conditions may include any interaction between the geometries, representations of the geometries and/or the circles. Along these lines, if the compared geometries, including the circles or representation of geometries, touch, intersect, contain, and/or other interaction may be employed in the comparisons.

According to one example, the first filter condition may be fulfilled if there is any interaction between a query and/or data geometries, representations of the geometries and/or the defined circles. If no interaction exists, then a geometry may immediately be excluded from potential candidates. Otherwise, the geometry may be included in a set of potential candidates.

The comparison of two geometries may be carried out a number of times at a number of levels to determine if the geometries might fulfill an ultimate desired interaction. For example, a representation of the first geometry and a number of circles may be defined with respect to a first geometry. A second geometry may be compared first to a representation of the first geometry. If the second geometry is a potential candidate after that comparison, then the second geometry may be compared to the circles one by one to determine if a filter condition is fulfilled. By making such multiple comparisons, geometries may be relatively easily excluded or included in a set of potential candidates. For example, if a second geometry were contained within one of the defined circles, the geometry could be included in a set of results without carrying out an exact geometric comparison.

According to one embodiment, a minimum bounding rectangle for a data geometry is identified. Then, a center for the data geometry and a query geometry are identified. A maximum distance is identified from any corner of the minimum bounding rectangle to the center of the data geometry. This maximum distance is added to the distance between the center of the query geometry and the center of the data geometry. If the sum of these distances is less than or equal to the radius of a circle inscribed in the query geometry as described above, then the minimum bounding rectangle of the data geometry is inside the interior circle.

If it is not determined whether the data minimum bounding rectangle is inside the query geometry interior circle, then the center of the minimum bounding rectangle of the data geometry is chosen as a center in making the distance sums and comparisons described above. This is in place of using the center of the query geometry. A minimum distance is identified from the center of the minimum bounding rectangle of the data geometry to the border of the query geometry. Using the center of the minimum bounding rectangle as the center a circle is defined having as its radius the minimum distance from the center of the minimum bounding rectangle of the data geometry to the border of the query geometry. The radius of this circle is then compared to the maximum distance from any corner of the minimum bounding rectangle to the center of the data geometry. If the radius of this circle is greater than or equal to the maximum distance from any corner of the minimum bounding rectangle to the center of the data geometry, then the data minimum bounding rectangle is inside the interior circle.

According to another embodiment, minimum bounding volumes may be determined for all geometries. This could be accomplished by determining the maximum extent of each geometry along each of three orthogonal axes. Planes may be defined perpendicular to each axis at the point of the maximum extent of the geometry. The minimum bounding volumes may be compared to determine whether geometries may intersect. If the minimum bounding volumes do not intersect, then it can be assured that the geometries do not intersect. If the minimum bounding volumes do intersect, then further processing as described herein may be necessary to determine the extent of the intersection.

After carrying out the comparisons above, if it cannot be determined whether a first geometry has a specified relationship with respect to a second geometry, then an exact mathematical comparison of the geometries typically is carried out. A benefit of the present invention is that it relatively easily permits identification of candidate geometries, thereby reducing the number of geometries for which a costly and time consuming exact comparison must be carried out. In some cases, the present invention is utilized to determine whether geometries are within a certain distance of each other. In such cases, the geometries or representations thereof may be compared to determine whether such interaction exists.

Figure 10:
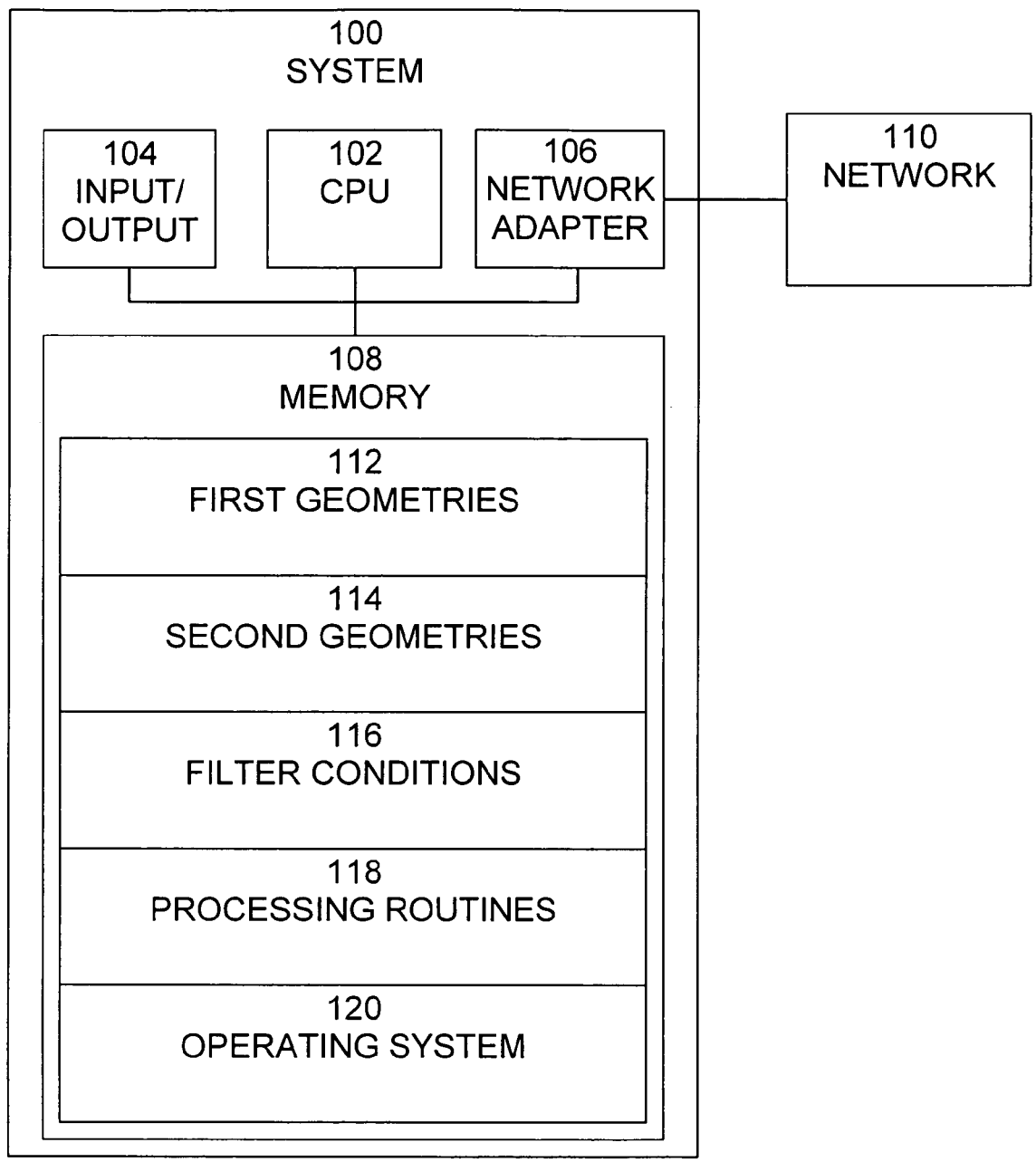
FIG. 10 represents an exemplary block diagram of a system according to the present invention for performing a process of determining relationships among objects represented in a database.

The present invention also includes a system for performing a process of determining relationships among objects represented in a database. FIG. 10 illustrates an exemplary block diagram of a system 100, according to the present invention. The system 100 typically includes a programmed general-purpose computer system, such as a personal computer, workstation, server system, and minicomputer or mainframe computer. The system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touch-pads, trackballs, scanners, etc., output devices, such as video adapters, monitors, printers, etc., and input/output devices, such as, modems, etc. Network adapter 106 interfaces system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as query geometry block 112, data geometry block 114, and filter conditions block 116, and a plurality of blocks of program instructions, such as processing routines 118 and operating system 120. Query geometry block 112 stores query geometries that have been received by transaction processing system 100. Data geometries block 114 stores a plurality of data geometries that may be compared to the query geometry. Filter conditions block stores filter conditions that may be utilized to determine if the first and second geometries have desired interactions. Processing routines 118 are software routines that implement the processing performed by the present invention. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

By using a three-dimensional model, the present invention avoids distorted topographical relationships introduced by two-dimensional modeling of three-dimensional geometries. Also, utilizing a three-dimensional model can eliminate wrapping around problems. Along these lines, data on the surface of the earth typically cannot be modeled by 2-dimensional planes due to "circularity" of the coordinate space. In contrast, 2-d planar models ensure increasing and non-circular coordinate space. Planar models typically cannot be used to model spherical surface data such as locations on the surface of earth. However, if the system is localized to a small area such as single province, then that data can be modeled using 2-d plane just as a small portion of a big-circle can be approximated by a straight-line. If the computations cross small regions, all planar models typically are inadequate and can lead to distortions in computed distances and relationships. Distances using a three-dimensional model can be accurate up to about 0.4%. Also, topographical relationships may be precisely represented.

The present invention also results in reduced processing times, producing associated benefits. For example, according to one experiment using 10,000 randomly-generated rectangles and queries, due to the optimization provided by the present invention, the queries eliminated (added to result set directly without passing to) the secondary filter for nearly 50% of the query results. The query response time in this example improved from about 8.5 seconds to about 4.8 seconds, which represents an increase in speed of nearly 45% faster.

Processing a large query window that may retrieve multiple data items is performed as follows: Identify interior circles for the query window, compute a circle enscribing the data mbr, and compare the data-mbr-circle with each interior circle of the query window. If the data-mbr-circle is interior, then the data item is directly included in result set (bypassing the expensive secondary filter comparison between query and data "geometries").

Figure 11:
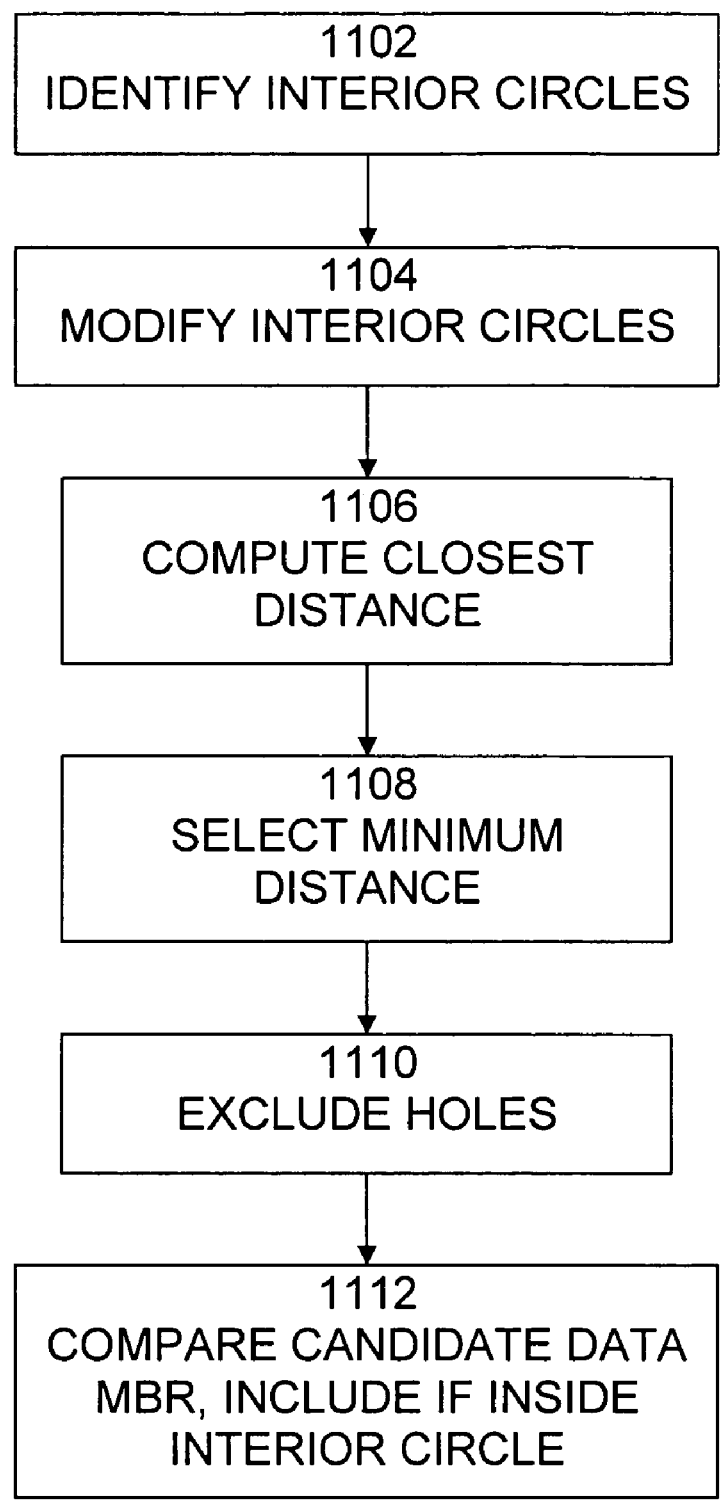
FIG. 11 is an exemplary flow diagram of a process for handling spatial queries that involve query windows that contain voids.
Figure 12:
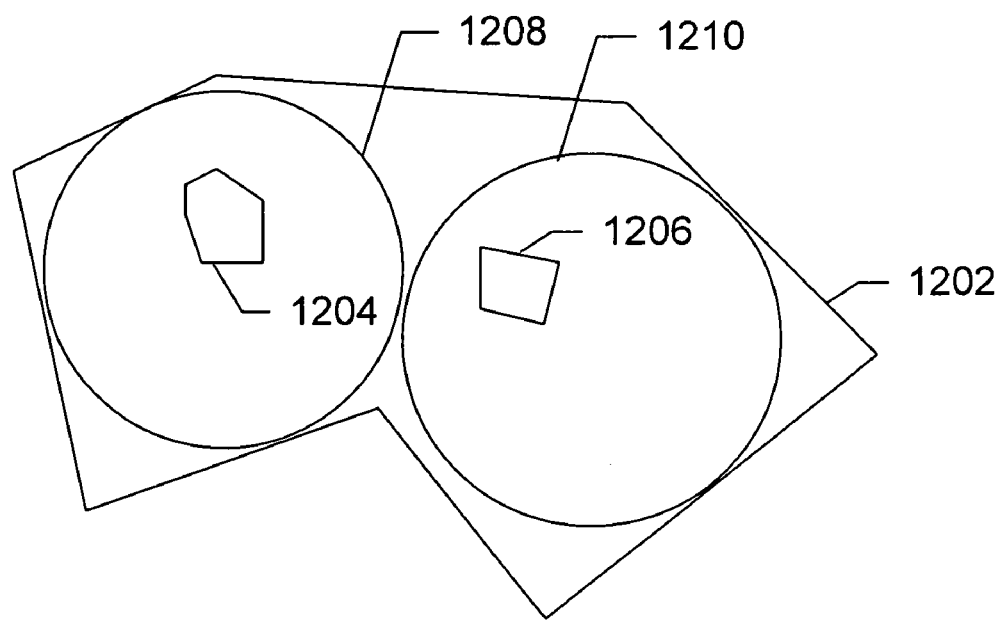
FIG. 12 is an exemplary block diagram of the application of the process shown in FIG. 11 to a specific exemplary query.
Figure 13:
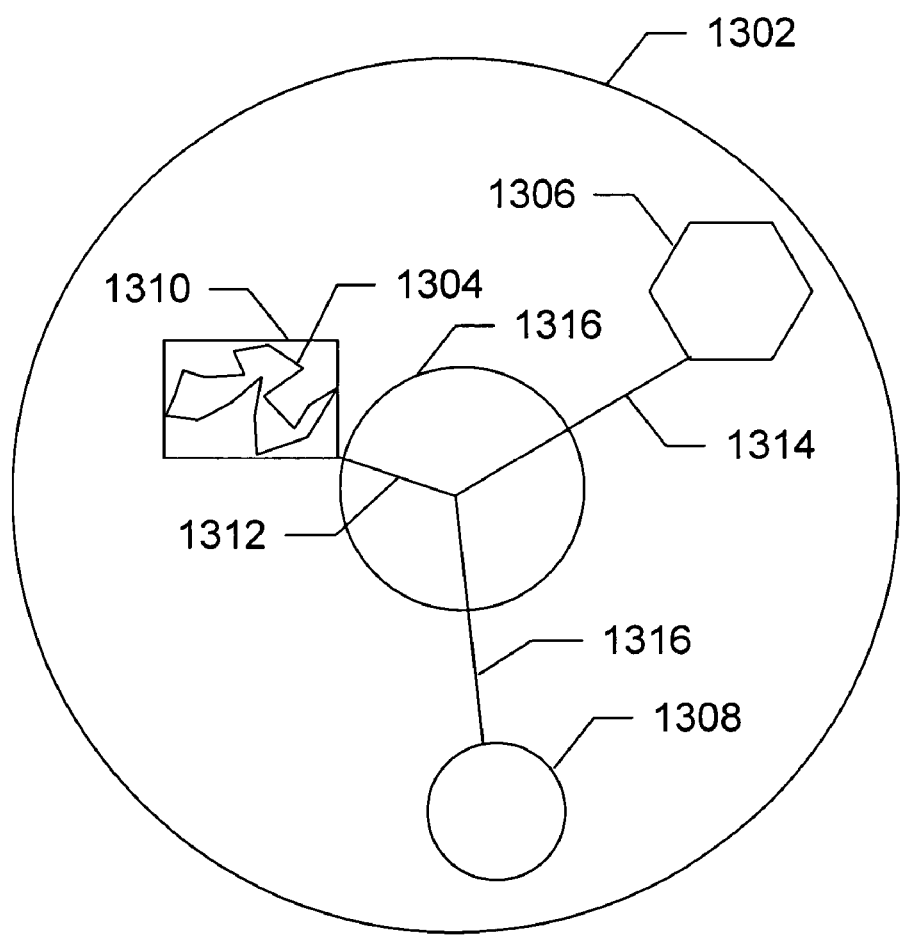
FIG. 13 is an exemplary block diagram of the application of the process shown in FIG. 11 to a specific exemplary query.

Processing of query windows that contain voids (holes) in a fast and efficient manner is provided by the present invention. An example of a process 1100 for handling spatial queries that involve query windows that contain voids is shown in FIG. 11. FIG. 11 is best viewed in conjunction with FIGS. 12 and 13, which are examples of the application of process 1100 to a specific exemplary query. Process 1100 begins with step 1102, in which interior circles of a query window are identified. In the example shown in FIG. 12, query window 1202 includes a number of voids, such as void 1204 and void 1206. Interior circles 1208 and 1210 have been identified within query window 1202. As seen, interior circles 1208 and 1210 contain voids that are present within query window 1202.

In step 1104, those interior circles that contain voids are modified to exclude those voids. Each interior circle containing a void is modified as shown in steps 1106-1110. In step 1106, the closest distance from the center of the interior circle to the closest point of each void or the closest point of the MBR of the void is computed. In the example shown in FIG. 13, interior circle 1302 contains voids 1304, 1306, and 1308. Void 1304 is bounded by MBR 1310. The closest distance from the center of interior circle 1302 to the closest point of MBR 1310 is distance 1312. The closest distance from the center of interior circle 1302 to the closest point of void 1306 is distance 1314. The closest distance from the center of interior circle 1302 to the closest point of void 1308 is distance 1316.

In step 1108, the minimum of the closest distances from the center of the interior circle to the closest point of each void or the closest point of the MBR of the void is selected. In the example shown in FIG. 13, the minimum distance is distance 1312. Thus, distance 1312 is selected in this step. In step 1110, the voids contained in the interior circle are excluded by forming a new interior circle having the same center point as the original interior circle, but having a radius equal to the minimum distance selected in step 1108. In the example shown in FIG. 13, a new interior circle 1316 is formed, which has the same center point as original interior circle 1302, but which has a radius equal to the minimum distance selected in step 1108, distance 1312. As is seen, all voids that were contained in original interior circle 1302 are excluded from new interior circle 1316.

In step 1112, the modified interior circles of the query window are used to evaluate the query. In particular, each candidate data MBR is compared with the modified interior circles of a query. If the data MBR is inside the interior circle, then the data item represented by the data MBR is directly included in the result set of the query.

Figure 14:
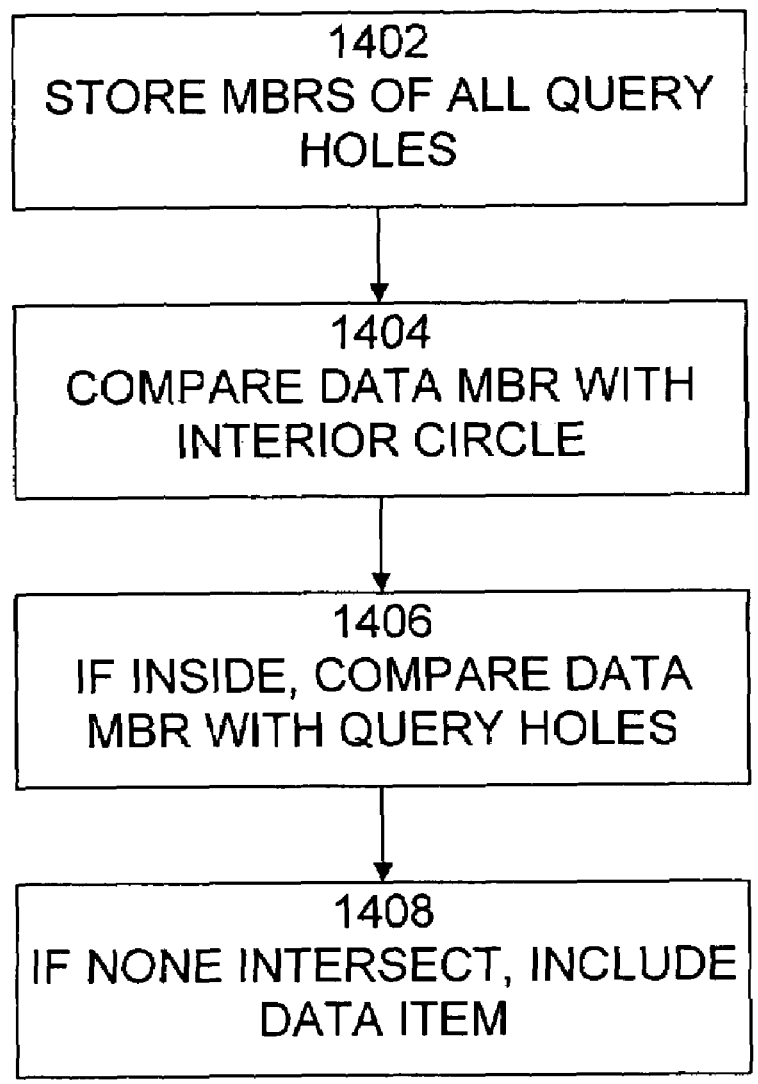
FIG. 14 is an exemplary flow diagram of a process for handling spatial queries that involve query windows that contain voids.

Another example of a process 1400 for handling spatial queries that involve query windows that contain voids is shown in FIG. 14. Process 1400 begins with step 1402, in which MBRs for all voids in the query window are determined and stored. In this example, the interior circles of the query window are not modified as in process 1100. Rather, in step 1404, the each data MBR is compared with the unmodified interior circles of the query window. In step 1406, for each data MBR that is inside an unmodified interior circle of the query window, the data MBR is compared with the voids in the query window. In step 1408, if there is no void that intersects the data MBR, then the data item represented by the data MBR is directly included in the result set of the query.

In order to implement process 1400, memory is needed to store representations of the voids in the query window. Preferably, the voids are ordered in memory using x or y ordinated, in order to improve the speed with which process 1400 is performed.

Figure 15:
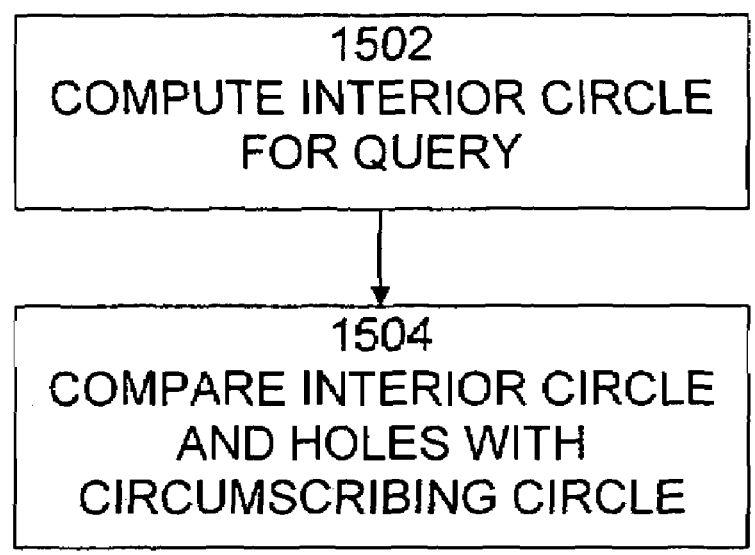
FIG. 15 is an exemplary flow diagram of a process for handling data items that cannot be directly included in the query result set.

Both process 1100 and process 1400 may not resolve the query completely. That is, while the processes may be able to include some data items directly in the query result set, it is also possible that there will be some data items that cannot be directly included in the query result set by those processes. In this case, an additional process 1500 may be performed, as shown in FIG. 15. Process 1500 begins with step 1502, in which, for each data item not included in the query result set by a previous process, an interior circle for the query window is computed using the center of the data MBR representing the data item as the center of the interior circle. In step 1504, the interior circle computed in step 1502 and the associated voids in the query window are compared with a circle that circumscribes the data MBR representing the data item. In order to perform the comparison of step 1504, processes similar to processes 1100 and 1400 may be used. If processes similar to processes 1100 and 1400 are used, then the original interior circles that are used in those processes are those that are computed according to step 1502.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A computer-implemented method for evaluating a spatial query comprising:
   receiving a spatial query defining a query window including a void;
   identifying at least one interior circle for the query window, wherein the at least one interior circle includes a void;
   modifying the at least one interior circle to exclude the void;
   using the at least one modified interior circle to determine data items that satisfy the spatial query from among a plurality of data items; and
   outputting a result set of the query, the result set including those data items that satisfy the spatial query.

2. The computer-implemented method of claim 1, wherein modifying the at least one interior circle to exclude the void comprises:
   determining a distance from a center of the at least one interior circle to a closest point of the void or to a closest point of a minimum bounding rectangle of the void; and
   modifying the at least one interior circle to form a modified interior circle having a same center as the at least one interior circle and having a radius equal to the determined distance.

3. The computer-implemented method of claim 2, wherein using the at least one modified interior circle to evaluate the spatial query comprises:
   comparing each of a plurality of candidate data minimum bounding rectangles to the at least one modified interior circle; and
   including a data item represented by a data minimum bounding rectangle in the result set of the query, when the data minimum bounding rectangle is inside the at least one modified interior circle.

4. The computer-implemented method of claim 3, further comprising:
   for each data item not included in the query result set, computing an interior circle for the query window using the center of a data minimum bounding rectangle representing the data item as a center of a new interior circle; and
   comparing the new interior circle and the voids included in the query window with a circle that circumscribes the data minimum bounding rectangle representing the data item; and
   including the data item in a result set of the query, when the data minimum bounding rectangle is inside the new interior circle.

5. The computer-implemented method of claim 1, wherein the at least one interior circle includes a plurality of voids and modifying the at least one interior circle to exclude the voids comprises:
   determining a distance from a center of the at least one interior circle to a closest point of each of the plurality of voids or to a closest point of a minimum bounding rectangle of each of the plurality of voids to form a plurality of determined distances;
   selecting a minimum distance from among the plurality of determined distances; and
   modifying the at least one interior circle to form a modified interior circle having a same center as the at least one interior circle and having a radius equal to the selected distance.

6. The computer-implemented method of claim 5, wherein using the at least one modified interior circle to evaluate the spatial query comprises:
   comparing each of a plurality of candidate data minimum bounding rectangles to the at least one modified interior circle; and
   including a data item represented by a data minimum bounding rectangle in a result set of the query, when the data minimum bounding rectangle is inside the at least one modified interior circle.

7. The computer-implemented method of claim 6, further comprising:
   for each data item not included in the query result set, computing an interior circle for the query window using the center of a data minimum bounding rectangle representing the data item as a center of a new interior circle; and
   comparing the new interior circle and the voids included in the query window with a circle that circumscribes the data minimum bounding rectangle representing the data item; and
   including the data item in a result set of the query, when the data minimum bounding rectangle is inside the new interior circle.

8. A computer-implemented method for evaluating a spatial query comprising:
   receiving a spatial query defining a query window including a void;

identifying an interior circle for the query window, wherein the interior circle includes avoid;

determining a minimum bounding rectangle for the void;

comparing the minimum bounding rectangle for the void with the interior circle for the query window to determine whether the minimum bounding rectangle for the void is inside the interior circle for the query window;

comparing each of a plurality of candidate data minimum bounding rectangles to the interior circle to determine whether the data minimum bounding rectangle is inside the interior circle for the query window;

comparing each data minimum bounding rectangle that is inside the interior circle for the query window with a void for which the minimum bounding rectangle for the void is inside the interior circle for the query window to determine whether the data minimum bounding rectangle intersects with the void;

including a data item in the result set of the query, when the data minimum bounding rectangle of the data item is inside the interior circle, but does not intersect the void; and outputting the result set of the query including the data items included in the result set.

9. The computer-implemented method of claim 8, further comprising:

for each data item not included in the query result set, computing an interior circle for the query window using the center of a data minimum bounding rectangle representing the data item as a center of a new interior circle; and comparing the new interior circle and the voids included in the query window with a circle that circumscribes the data minimum bounding rectangle representing the data item; and including the data item in a result set of the query, when the data minimum bounding rectangle is inside the new interior circle.

10. A computerized system for evaluating a spatial query comprising:

a processor operable to execute computer program instructions;

a memory operable to store computer program instructions executable by the processor; and computer program instructions stored in the memory and executable to perform the steps of:

receiving a spatial query defining a query window including a void;

identifying at least one interior circle for the query window, wherein the at least one interior circle includes a void;

modifying the at least one interior circle to exclude the void;

using the at least one modified interior circle to determine data items that satisfy the spatial query from among a plurality of data items; and outputting a result set of the query, the result set including those data items that satisfy the spatial, query.

11. The computerized system of claim 10, wherein modifying the at least one interior circle to exclude the void comprises:

determining a distance from a center of the at least one interior circle to a closest point of the void or to a closest point of a minimum bounding rectangle of the void; and modifying the at least one interior circle to form a modified interior circle having a same center as the at least one interior circle and having a radius equal to the determined distance.

12. The computerized system of claim 11, wherein using the at least one modified interior circle to evaluate the spatial query comprises:

comparing each of a plurality of candidate data minimum bounding rectangles to the at least one modified interior circle; and including a data item represented by a data minimum bounding rectangle in a result set of the query, when the data minimum bounding rectangle is inside the at least one modified interior circle.

13. The computerized system of claim 12, further comprising:

for each data item not included in the query result set, computing an interior circle for the query window using the center of a data minimum bounding rectangle representing the data item as a center of a new interior circle; and comparing the new interior circle and the voids included in the query window with a circle that circumscribes the data minimum bounding rectangle representing the data item; and including the data item in a result set of the query, when the data minimum bounding rectangle is inside the new interior circle.

14. The computerized system of claim 10, wherein the at least one interior circle includes a plurality of voids and modifying the at least one interior circle to exclude the void comprises:

determining a distance from a center of the at least one interior circle to a closest point of each of the plurality of voids or to a closest point of a minimum bounding rectangle of each of the plurality of voids to form a plurality of determined distances;

selecting a minimum distance from among the plurality of determined distances; and modifying the at least one interior circle to form a modified interior circle having a same center as the at least one interior circle and having a radius equal to the selected distance.

15. The computerized system of claim 14, wherein using the at least one modified interior circle to evaluate the spatial query comprises:

comparing each of a plurality of candidate data minimum bounding rectangles to the at least one modified interior circle; and including a data item represented by a data minimum bounding rectangle in a result set of the query, when the data minimum bounding rectangle is inside the at least one modified interior circle.

16. The computerized system of claim 15, further comprising:

for each data item not included in the query result set, computing an interior circle for the query window using the center of a data minimum bounding rectangle representing the data item as a center of a new interior circle; and comparing the new interior circle and the voids included in the query window with a circle that circumscribes the data minimum bounding rectangle representing the data item; and including the data item in a result set of the query, when the data minimum bounding rectangle is inside the new interior circle.

17. A computerized system for evaluating a spatial query comprising:
a processor operable to execute computer program instructions;
a memory operable to store computer program instructions executable by the processor; and
computer program instructions stored in the memory and executable to perform the steps of:
receiving a spatial query defining a query window including a void;
identifying an interior circle for the query window, wherein the interior circle includes a void;
determining a minimum bounding rectangle for the void;
comparing the minimum bounding rectangle for the void with the interior circle for the query window to determine whether the minimum bounding rectangle for the void is inside the interior circle for the query window;
comparing each of a plurality of candidate data minimum bounding rectangles to the interior circle to determine whether the data minimum bounding rectangle is inside the interior circle for the query window;
comparing each data minimum bounding rectangle that is inside the interior circle for the query window with a void for which the minimum bounding rectangle for the void is inside the interior circle for the query window to determine whether the data minimum bounding rectangle intersects with the void;
including a data item in a result set of the query, when the data minimum bounding rectangle of the data item is inside the interior circle, but does not intersect the void; and
outputting the result set of the query including the data items included in the result set.

18. The computerized system of claim 17, further comprising:
for each data item not included in the query result set, computing an interior circle for the query window using the center of a data minimum bounding rectangle representing the data item as a center of a new interior circle; and
comparing the new interior circle and the voids included in the query window with a circle that circumscribes the data minimum bounding rectangle representing the data item; and
including the data item in a result set of the query, when the data minimum bounding rectangle is inside the new interior circle.

19. A computer program product for evaluating a spatial query comprising:
a computer readable medium;
computer program instructions, recorded on the computer readable medium, executable by a processor, for performing the steps of
receiving a spatial query defining a query window including a void;
identifying at least one interior circle for the query window, wherein the at least one interior circle includes a void;
modifying the at least one interior circle to exclude the void;
using the at least one modified interior circle to determine data items that satisfy the spatial query from among a plurality of data items; and
outputting a result set of the query, the result set including those data items that satisfy the spatial query.

20. The computer program product of claim 19, wherein modifying the at least one interior circle to exclude the void comprises:
determining a distance from a center of the at least one interior circle to a closest point of the void or to a closest point of a minimum bounding rectangle of the void; and
modifying the at least one interior circle to form a modified interior circle having a same center as the at least one interior circle and having a radius equal to the determined distance.

21. The computer program product of claim 20, wherein using the at least one modified interior circle to evaluate the spatial query comprises:
comparing each of a plurality of candidate data minimum bounding rectangles to the at least one modified interior circle, and
including a data item represented by a data minimum bounding rectangle in a result set of the query, when the data minimum bounding rectangle is inside the at least one modified interior circle.

22. The computer program product of claim 21, further comprising:
for each data item not included in the query result set, computing an interior circle for the query window using the center of a data minimum bounding rectangle representing the data item as a center of a new interior circle; and
comparing the new interior circle and the voids included in the query window with a circle that circumscribes the data minimum bounding rectangle representing the data item; and
including the data item in a result set of the query, when the data minimum bounding rectangle is inside the new interior circle.

23. The computer program product of claim 19, wherein the at least one interior circle includes a plurality of voids and modifying the at least one interior circle to exclude the void comprises:
determining a distance from a center of the at least one interior circle to a closest point of each of the plurality of voids or to a closest point of a minimum bounding rectangle of each of the plurality of voids to form a plurality of determined distances;
selecting a minimum distance from among the plurality of determined distances; and
modifying the at least one interior circle to form a modified interior circle having a same center as the at least one interior circle and having a radius equal to the selected distance.

24. The computer program product of claim 23, wherein using the at least one modified interiorcircie to evaluate the spatial query comprises:
comparing each of a plurality of candidate data minimum bounding rectangles to the at least one modified interior circle; and
including a data item represented by a data minimum bounding rectangle in a result set of the query, when the data minimum bounding rectangle is inside the at least one modified interior circle.

25. The computer program product of claim 24, further comprising:
for each data item not included in the query result set, computing an interior circle for the query window using the center of a data minimum bounding rectangle representing the data item as a center of a new interior circle; and comparing the new interior circle and the voids included in the query window with a circle that circumscribes the data minimum bounding rectangle representing the data item; and including the data item in a result set of the query, when the data minimum bounding rectangle is inside the new interior circle.

26. A computer program product for evaluating a spatial query comprising:

a computer readable medium;

computer program instructions, recorded on the computer readable medium, executable by a processor, for performing the steps of receiving a spatial query defining a query window including a void;

identifying an interior circle for the query window, wherein the interior circle includes avoid;

detennining a minimum bounding rectangle for the void;

comparing the minimum bounding rectangle for the void with the interior circle for the query window to detennine whether the minimum bounding rectangle for the void is inside the interior circle for the query window;

comparing each of a plurality of candidate data minimum bounding rectangles to the interior circle to determine whether the data minimum bounding rectangle is inside the interior circle for the query window;

comparing each data minimum bounding rectangle that is inside the interior circle for the query window with a void for which the minimum bounding rectangle for the void is inside the interior circle for the query window to determine whether the data minimum bounding rectangle intersect with the void;

including a data item in a result set of the query, when the data minimum bounding rectangle of the data item is inside the interior circle, but does not intersect the void; and outputting the result set of the query, based on the evaluation of the spatial query.

27. The computer program product of claim 26, further comprising:

for each data item not included in the query result set, computing an interior circle for the query window using the center of a data minimum bounding rectangle representing the data item as a center of a new interior circle; and comparing the new interior circle and the voids included in the query window with a circle that circumscribes the data minimum bounding rectangle representing the data item; and including the data item in a result set of the query, when the data minimum bounding rectangle is inside the new interior circle.

* * * * *

UNITED STATES PATENT AND TRADEMARK OFFICE
CERTIFICATE OF CORRECTION

PATENT NO. : 7,379,936 B2
APPLICATION NO. : 11/122011
DATED : May 27, 2008
INVENTOR(S) : Kothuri et al.

It is certified that error appears in the above-identified patent and that said Letters Patent is hereby corrected as shown below:

In column 10, line 51–59, delete "satisfied......geometry." and insert the same on line 50 after "are" as a continuation of the same paragraph.

In column 11, line 39, delete "(x1-x1)" and insert -- (x2-x1) --, therefor.

In column 12, line 4–7, delete "geometries.....out." and insert the same on line 3 after "candidate" as a continuation of the same paragraph.

In column 15, line 5, delete "electromechanical" and insert -- electro-mechanical --, therefor.

In column 19, line 2, in claim 8, delete "avoid;" and insert -- a void; --, therefor.

In column 19, line 60, in claim 10, after "spatial" delete ",".

In column 22, line 17, in claim 21, after "circle" delete "," and insert -- ; --, therefor.

In column 22, line 52, in claim 24, delete "interiorcircie" and insert -- interior circle --, therefor.

In column 23, line 17, in claim 26, delete "avoid;" and insert -- a void; --, therefor.

In column 23, line 18, in claim 26, delete "detennining" and insert -- determining --, therefor.

UNITED STATES PATENT AND TRADEMARK OFFICE
CERTIFICATE OF CORRECTION

PATENT NO. : 7,379,936 B2
APPLICATION NO. : 11/122011
DATED : May 27, 2008
INVENTOR(S) : Kothuri et al.

It is certified that error appears in the above-identified patent and that said Letters Patent is hereby corrected as shown below:

In column 23, line 20–21, in claim 26, delete "detennine" and insert -- determine --, therefor.

Signed and Sealed this

Seventh Day of July, 2009

JOHN DOLL
*Acting Director of the United States Patent and Trademark Office*